US006607684B1

(12) United States Patent
Lee et al.

(10) Patent No.: US 6,607,684 B1
(45) Date of Patent: Aug. 19, 2003

(54) METHOD OF MAKING A JOINTED LINKAGE SUPPORT SYSTEM

(75) Inventors: James S. W. Lee, Long Island, NY (US); Chiu-Keung Kwan, Kowloon (HK)

(73) Assignee: C. J. Associates, Ltd., Kowloon (HK)

( * ) Notice: Subject to any disclaimer, the term of this patent is extended or adjusted under 35 U.S.C. 154(b) by 0 days.

(21) Appl. No.: 09/665,031

(22) Filed: Sep. 19, 2000

(51) Int. Cl.[7] .................. B29C 45/14; B29C 65/66; B29C 65/70
(52) U.S. Cl. .................. 264/230; 264/242; 264/250; 264/255; 264/263; 264/277
(58) Field of Search .................. 264/242, 250, 264/255, 264, 275, 277, 271.1, 261, 263, 274, 230; 428/33, 167, 172

(56) References Cited

U.S. PATENT DOCUMENTS

| | | |
|---|---|---|
| 292,919 A | 2/1884 | Kihlgren |
| 703,899 A | 7/1902 | Debes |
| 1,270,781 A | 7/1918 | Cabana |
| 1,359,030 A | 11/1920 | Cabana |
| 1,500,921 A | 7/1924 | Bramson et al. |
| 1,595,203 A | 8/1926 | Leathers |
| 1,909,430 A | 5/1933 | Skillman |
| 1,943,631 A | 1/1934 | Skillman |
| 2,007,784 A | 7/1935 | Wittmann |
| 2,027,560 A | 1/1936 | Skillman |
| 2,118,677 A | 5/1938 | Lower |
| 2,129,421 A | 9/1938 | Hales |
| 2,165,473 A | 7/1939 | Greneker |
| 2,285,472 A | 6/1942 | Tenebaum |
| 2,460,880 A | 2/1949 | Geizer et al. |
| 2,807,119 A | 9/1957 | Beebe |
| 2,954,992 A | 10/1960 | Baker |
| 3,011,219 A | 12/1961 | Williams |
| 3,065,566 A | 11/1962 | Sugimoto |
| 3,094,376 A | 6/1963 | Thomas |

(List continued on next page.)

FOREIGN PATENT DOCUMENTS

| | | |
|---|---|---|
| DE | 296 17 666 U1 | 1/1997 |
| EP | 0250063 | 11/1987 |
| GB | 2317641 A | 4/1998 |
| JP | 62050112 | 3/1987 |
| JP | 62129076 | 6/1987 |
| JP | 62246392 | 10/1987 |

OTHER PUBLICATIONS

"Skipper" doll (Exhibit A).
Babe Ruth Figure (Exhibit B).
"G. I. Joe" figure (Exhibit C).
"Barbie" figure (Exhibit D).
"He–Man" figure (Exhibit E).
"Marshall Bravestarr" figure (Exhibit F).

*Primary Examiner*—Angela Ortiz
(74) *Attorney, Agent, or Firm*—Michael, Best & Friedrick, LLC

(57) ABSTRACT

A jointed linkage support system is provided with joints that allow movement and bending in many directions and degrees of freedom. A chain-like linkage system made up of a series of joints is molded in a single step from materials having different melting temperatures in a series of alternating communicating mold cavities. The jointed linkage support system emerges from the mold fully assembled. An electrical switch may be provided within.one of the joints between sleeves and rods whereby movement of the rod relative to the sleeve actuates the switch.

21 Claims, 12 Drawing Sheets

U.S. PATENT DOCUMENTS

| | | |
|---|---|---|
| 3,277,601 A | 10/1966 | Ryan |
| 3,319,846 A | 5/1967 | Wolf |
| 3,350,812 A | 11/1967 | Lindsay et al. |
| 3,361,310 A | 1/1968 | Ziegler et al. |
| 3,425,155 A | 2/1969 | Ryan et al. |
| 3,466,793 A | 9/1969 | Pugh et al. |
| 3,557,471 A | 1/1971 | Payne et al. |
| 3,591,669 A | 7/1971 | Memory |
| 3,609,911 A | 10/1971 | Hanf et al. |
| 3,628,282 A | 12/1971 | Johnson et al. |
| 3,699,710 A | 10/1972 | Glass et al. |
| 3,716,942 A | 2/1973 | Garcia et al. |
| 3,727,343 A | 4/1973 | Chiari |
| 3,740,894 A | 6/1973 | Howland et al. |
| 3,938,277 A | 2/1976 | Goldfarb et al. |
| 3,940,880 A | 3/1976 | Kaelin et al. |
| 3,941,495 A | 3/1976 | Duncan |
| 3,955,311 A | 5/1976 | Lyons et al. |
| 3,988,855 A | 11/1976 | Crabtree et al. |
| 4,006,555 A | 2/1977 | England et al. |
| 4,242,830 A | 1/1981 | Hauser |
| 4,274,224 A | 6/1981 | Pugh et al. |
| 4,279,099 A | 7/1981 | Dyer et al. |
| 4,290,181 A | 9/1981 | Jackson |
| 4,439,909 A | 4/1984 | Borgen et al. |
| 4,470,784 A | 9/1984 | Piotrovsky |
| 4,579,542 A | 4/1986 | Mayer et al. |
| 4,619,540 A | 10/1986 | Day et al. |
| 4,643,691 A | 2/1987 | Keiji |
| 4,669,998 A | 6/1987 | Amici et al. |
| 4,673,374 A | 6/1987 | Kelley |
| 4,680,019 A | 7/1987 | Baerenwald et al. |
| 4,708,687 A | 11/1987 | Goldberg et al. |
| 4,738,649 A | 4/1988 | Delli Bovi et al. |
| 4,790,789 A | 12/1988 | Mathis |
| 4,854,911 A | 8/1989 | Berliner et al. |
| 4,887,486 A | 12/1989 | Wood, Jr. |
| 4,902,220 A | 2/1990 | Nakagawa |
| 4,973,372 A | 11/1990 | Ditlinger |
| 4,995,846 A | 2/1991 | Mariol |
| 5,009,538 A | 4/1991 | Shirai et al. |
| 5,011,320 A | 4/1991 | Love et al. |
| 5,011,321 A | 4/1991 | Kidokoro |
| 5,078,531 A | 1/1992 | Sakai et al. |
| 5,140,869 A | 8/1992 | Mrdjenovich et al. |
| 5,150,981 A | 9/1992 | Miwa |
| 5,152,628 A | 10/1992 | Broszat et al. |
| 5,163,769 A | 11/1992 | Dresselhouse |
| 5,178,482 A | 1/1993 | Wood |
| 5,257,873 A | 11/1993 | Abbat |
| 5,267,805 A | 12/1993 | Ueno et al. |
| 5,277,860 A | 1/1994 | Sinclair |
| 5,334,073 A | 8/1994 | Tilbor et al. |
| 5,431,554 A | 7/1995 | Yoshida et al. |
| 5,531,625 A | 7/1996 | Zhong |
| 5,588,895 A | 12/1996 | Larson |
| 5,615,967 A | 4/1997 | Hellon |
| 5,756,029 A * | 5/1998 | Nakamichi et al. .......... 264/161 |
| 5,989,658 A | 11/1999 | Miura et al. |
| 6,033,284 A | 3/2000 | Ferre |
| 6,103,165 A * | 8/2000 | Miura ..................... 264/250 |

* cited by examiner

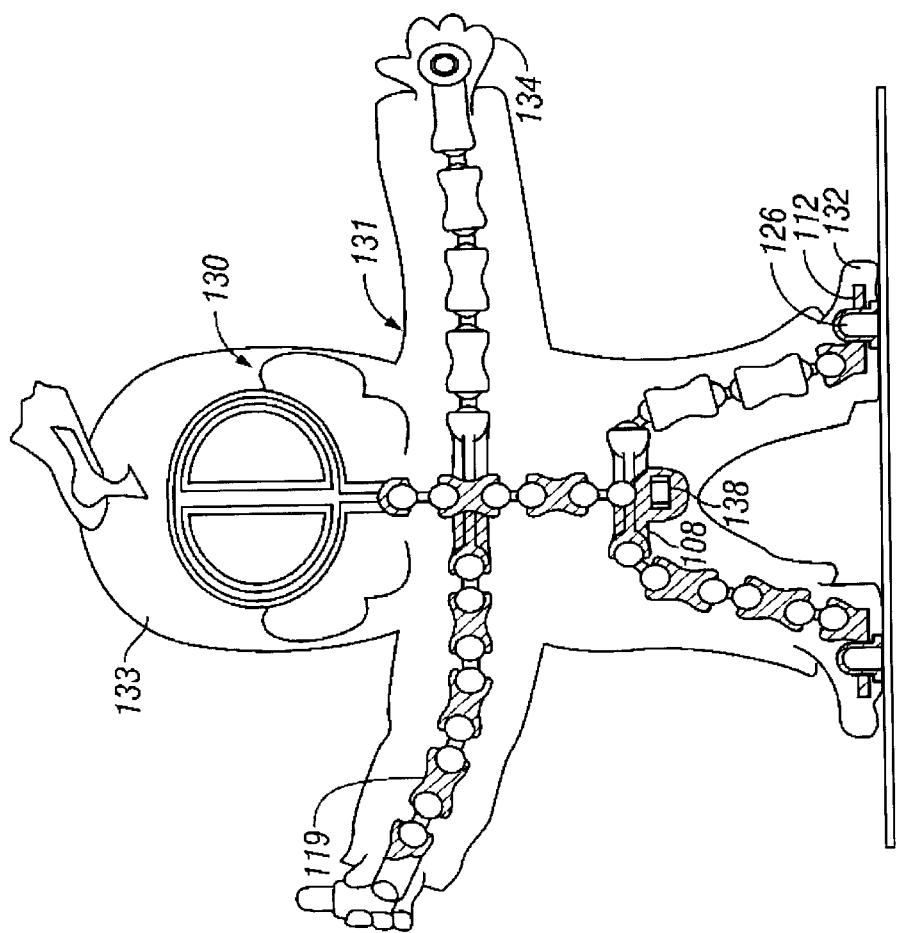
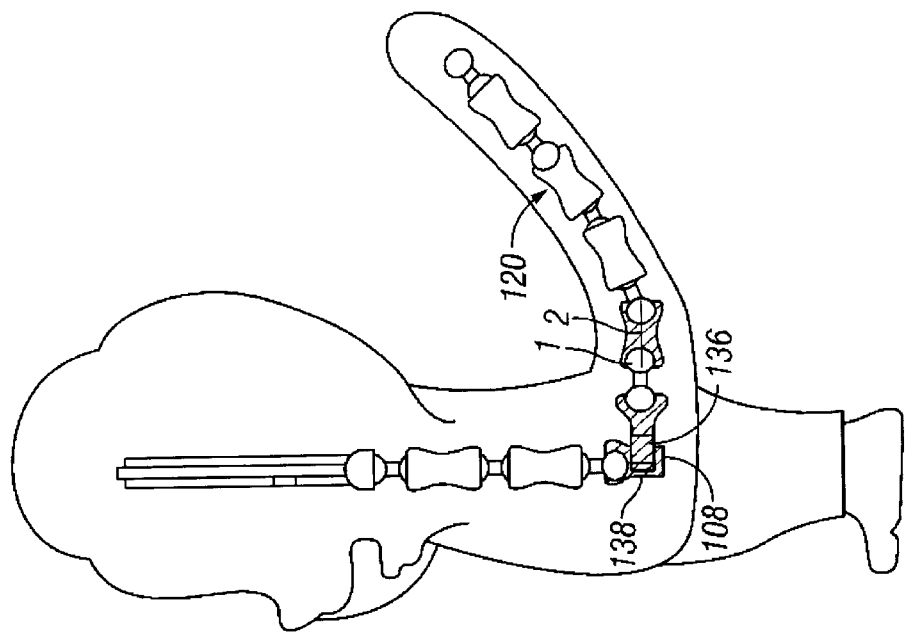
FIG. 7
FIG. 8

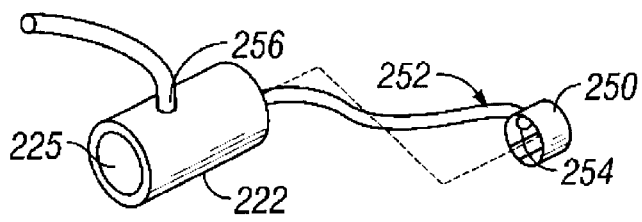
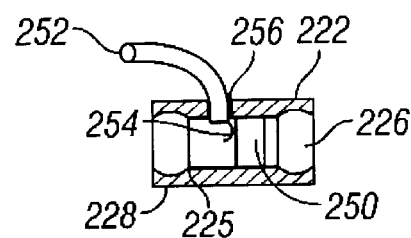
FIG. 9  FIG. 10
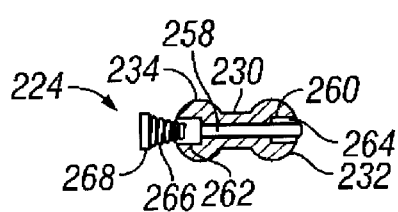
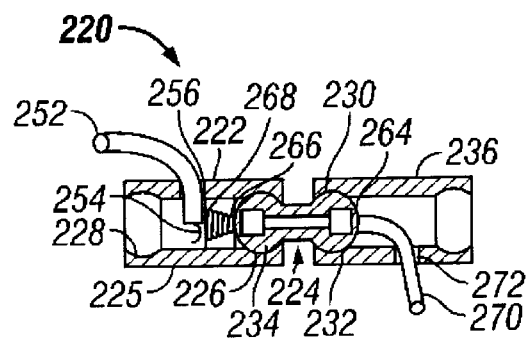
FIG. 11  FIG. 12
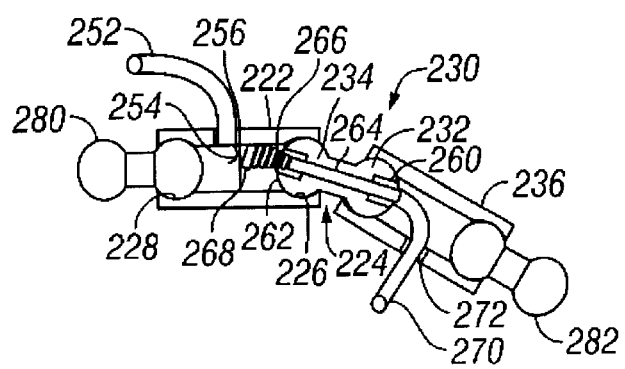
FIG. 13

METHOD OF MAKING A JOINTED LINKAGE SUPPORT SYSTEM

FIELD OF THE INVENTION

This invention relates to jointed linkage support systems and more particularly, but not exclusively, to support systems for toys having lifelike joints.

Background and Summary of the Invention

There are many uses for a jointed linkage support system of the described type. The system may serve, for example, as a toy for making original geometric forms, or as a support for an object on display. However, a principal use of particular interest to the inventors is as a skeleton for a toy such as a doll, an animal, or the like. Toy animals and figures with movable necks, arms, legs, and spines may be made in many forms including skeletal figures, action figures, fashion dolls and stuffed animals covered in plush, simulated fur or vinyl.

For any of these and many other uses, the present jointed linkage support system may take on many different forms. For example, one might use the human body as a model representative of structures which may be built according to the invention. As a generality, the neck, shoulder, and hip joints may rotate and move through a cone of 360° with the apex of the cone having an angle of up to nearly 90° taken with respect to the central axis of the cone. The present invention will satisfy these requirements. Of course, other degrees of motion about the joints are also achievable in the invention.

On the other hand, knees, elbows, spines, and other body parts may bend in different ways. For example, the lower arm and leg may twist and rotate over a somewhat limited distance, but neither bends backward. The elbow and knee only bend back and forth so that the range of movement of the lower arm and leg is quite different from the range of movement of the upper arm and leg. The ankle has a limited rotational and back-and-forth movement. The same is true of the arm and wrist. Toes and fingers have movement which is apparent to anyone who flexes them. These types of motion can also be achieved with the present invention.

The new inventive linkage system of the present invention is preferably used to create an internal skeleton support system for a stuffed plush/vinyl toy and used to replace the malleable metal-wire insert traditionally used in stuffed toys often called "bendable". The traditional "bendable" toy has used flexible wire inserts to give the toy a limited ability to bend in a somewhat random fashion. The present jointed linkage support system has a chain-like form, which is bendable in ways simulating actual body movements. This jointed linkage support system also overcomes the following problems common to metal-wire inserts:

Durability: The insert molding links that comprise the chain-like form of the new inventive linkage system provide many more play cycles than metal wire because the linkage system is not subject to metal wire fatigue. As a result of a number of play cycles in wire-supported bendable toys, the wire breaks. That breakage may, in turn, lead to cosmetic defects and create safety problems in the form of sharp, protruding broken wire tips.

Safety: It has been difficult to solve the potential safety problems created by the sharp points formed on the ends of wire materials used as inserts for toy figures and the like. The inventive jointed linkage support system uses molded parts which eliminate the sharp-point hazard present with metal-wire inserts. In fact, the linkage parts may be made with curved or rounded ends that add to the margin of safety over wire inserts.

Shape of Support System: Since this inventive linkage support system is produced by an injection molding process, it can provide a range of design and a degree of flexibility and strength not available in prior art systems.

Real-feel Feature: The insert-molding linkage parts have a rigidity that corresponds to the skeletons of real-life humans or animals, giving the feeling of real bones inside the soft stuffing materials, plush fabrics, vinyl skins, and the like. The prior art metal-wire inserts do not offer this unique real-feel feature. Likewise, the new inventive system may be used to form a display stand with legs and feet which may be raised or lowered, spread around or squeezed between obstacles. Hence, the invention offers a broad range of uses.

Accordingly, it is apparent that a preferred jointed linkage support system should provide for many alternative degrees of freedom. This need for flexibility of design creates a series of challenges. If the jointed linkage is created from an assembly of many loose parts as in conventional systems, the loose parts may have to be manually interconnected, which creates excessive labor costs. Or, if automatic assembly machines are used, they may be prohibitively expensive, especially if they must assemble a number of parts having different sizes and shapes. If such an automatic assembly machine is limited to assembling only parts having the same configurations, the freedom to design new devices using a linkage having many different configurations is lost.

Thus, there is a need to provide a molded, jointed linkage support system which is already assembled when it emerges from the mold. If the system is to be used as a skeleton for toys, there should be a negligible cost differential between the inventive jointed linkage support system and the malleable metal wire inserts used heretofore.

Another desirable feature is to include a switch integrally formed with the molded, jointed linkage support system. Such a switch may be actuated by relative movement of various components of the linkage support system. The switch may be used to activate special features associated with the jointed linkage support system, such as turning on lights, activating synthesized or recorded speech, or other sounds and the like.

Accordingly, an object of the invention is to provide a jointed linkage support system having the foregoing features. A general object of the invention is to provide a general-purpose system having many different uses. A particular object of the invention is to provide a jointed linkage system which may be used as a skeleton for toys.

Another object is to provide a method of making a joint having a controlled degree of freedom of movement.

Yet another object is to provide a molded jointed linkage support system which is already assembled as it emerges from the mold.

Still another object is to provide a molded jointed linkage support system having an integrally formed switch.

In keeping with an aspect of the invention, these and other objects are accomplished by providing a molded product made of plastics having different meeting temperatures. Using a ball and socket joint, by way of example, the ball part is first formed in any desired fashion such as molding in a separate mold plate. Preferably, the ball is made of a plastic material which has a first melting temperature. An injection mold plate is then provided with communicating cavities in the socket contours. The previously formed ball parts are placed in the corresponding socket cavities of the second mold plate so that the balls effectively become part of the second mold plate, with the balls projecting into the cavities corresponding to the sockets. The mold plate cavities corresponding to the sockets are charged with a plastic having a melting temperature which is lower than the melting temperature of the plastic forming the balls, referred to below as "low temperature plastic". Thus, after the plastic in the socket cavities solidifies, sockets are molded around the balls. The lower melting point of the plastic material enables sockets to solidify around the balls without fusing to the balls or causing any distortion of the balls.

If a jointed linkage support system is to be formed in accordance with the invention, a series of communicating mold cavities may be configured to provide a series of jointed linkages that provide different degrees of freedom of movement. Hence, unique jointed linkage support systems may be provided which are already assembled as they emerge from the mold. In the preferred usage, the communicating cavities are configured to provide jointed linkages having the geometry of a skeleton corresponding to the geometry of a skeleton of a human or animal which the toy, stuffed and covered with plush or vinyl, simulates.

In an embodiment of the invention a jointed linkage support system is provided which includes a motion actuated switch. The switch may be integrally formed with the jointed linkage support system, and the switch opened and closed by relative movement between various components of the jointed linkage support system.

The principles of the invention and a preferred embodiment thereof may be best understood from the following specification taken with the attached drawings.

BRIEF DESCRIPTION OF THE DRAWINGS

FIG. 6A shows a separate jointed linkage support system;

FIG. 7 is a front elevation view having an outline of a stuffed plush/vinyl toy with the molded jointed linkage support system inside the outline of the toy; and FIG. 8 is a partial side elevation view of the toy of FIG. 7 to show a molded tail linked to the jointed linkage support system inside the outline of the toy.

FIG. 9 is a perspective view of a sleeve and an annular contact element according to an embodiment of the invention comprising a joint switch;

FIG. 10 is a cross section of the sleeve of FIG. 9 with the annular contact mounted within the sleeve;

FIG. 11 is a cross section of a cooperating second part of a joint switch;

FIG. 12 is a cross section of an assembled joint switch shown in an orientation when the switch is open;

FIG. 13 is a cross section of an assembled joint switch shown in an orientation when the switch is closed;

DETAILED DESCRIPTION OF THE INVENTION

Figure 1:
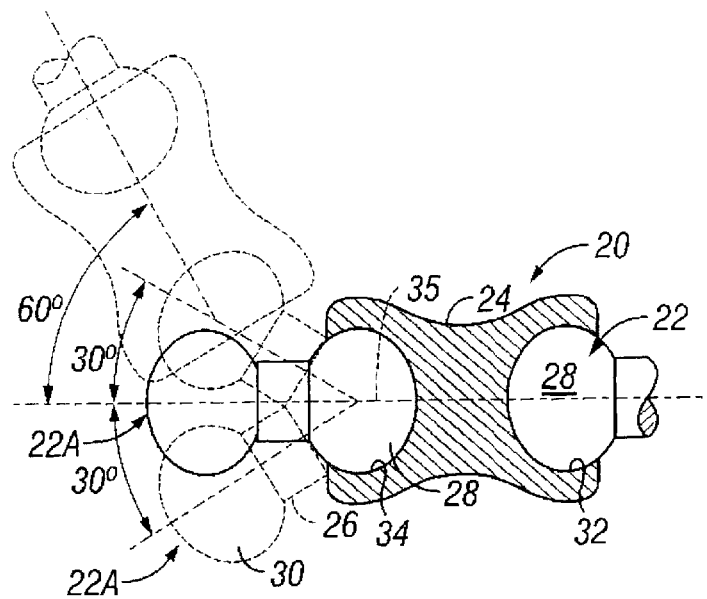
FIG. 1 is a plan view, partially in cross-section, showing a ball and socket joint with dot-dashed lines illustrating the freedom of motion for the ball and socket joint.

FIG. 1 shows the principles of a single flexible joint 20 having three parts, a pair of ball parts 22 and 22A in sockets 32 and 34 at opposite ends of a socket part 24. The ball parts each comprise a rod 26 with a ball 28, 30 on each end. The socket part 24 has cavities 32, 34 on each end. A ball of first ball part 22 is in socket 32 while a ball 28 of second ball part 22A is in socket 34.

The ball parts 22 and 22A are made from a first plastic having a relatively high melting temperature of from about 150° C. to 265° C. (and preferably about 175° C. to 265° C.). The socket parts 24 comprise a sleeve made from a second plastic having a lower melting temperature than the high melting temperature of the ball part 22 of from about 110° C. to 175° C. (and preferably about 130° C. to 175° C.). This way, the socket parts 24 may be molded with their sockets 32 and 34 encircling and retaining balls 28 and 30.

As the socket plastic cools, it shrinks to create a grip on the ball which provides enough resistance to hold the ball and socket in any selected position after a movement thereof, but the resistance is not enough to prevent manipulation of the joint.

Also, the socket part 24 and rod 26 are configured so that the ball part 22A may swivel without having the sleeve of one socket part engage, interfere with, and limit the movement of the sleeve of an adjoining socket part. The movement of the ball part 22A, as it pivots with respect to the axis of the ball and socket member, is indicated by dot-dashed lines on the left side of FIG. 1. In a preferred embodiment, the ball joint part 22A may swing 360° around and within an imaginary conical surface having an apex angle of about 60° taken with respect to an axis 35 of the imaginary cone.

Figure 2:
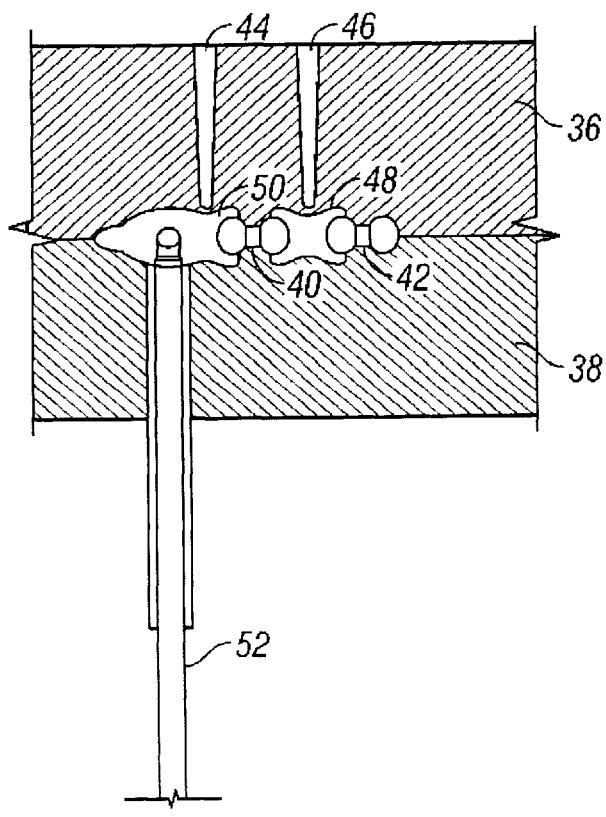
FIG. 2 is a cross-section of a two-plate injection mold for making a ball and socket jointed linkage support system.

The method of making the joint of FIG. 1 is illustrated in FIG. 2. Two mold plates 36, 38 have a cavity between them which is made in a conventional manner. Previously, the two ball parts 40, 42 were each made in a separate mold. The ball parts are made of a first plastic of a relatively high temperature melting point. Then, the ball parts are inserted in the corresponding cavities of mold plates 36, 38 and the mold is closed. Another plastic having a melting point which is lower than the melting point of the first plastic is injected into the cavity via gates 44, 46. The low melting plastic flows into the cavity and around the balls of parts 40, 42 to form socket parts 48, 50. Since the ball parts melt at a temperature higher than the temperature of the molten socket plastic, there is no adverse heat-caused effect on the contours of the ball parts. The result is that the ball parts 40, 42 are captured in the socket parts 48, 50 without any distortion or fusion of the low temperature plastic with the high temperature plastic.

Every thermoplastic material has shrinkage after a molding process. As a result of the shrinkage of the low temperature plastic, a friction is generated between the ball and the socket because there is a reduced diameter of the socket relative to the diameter of the ball in order to create a tight fit. With this friction between ball and socket, the joint is more likely to remain stationary after a manipulation of the joint, which tends to hold the toy in the position which the child playing with it selects.

Figure 2A:
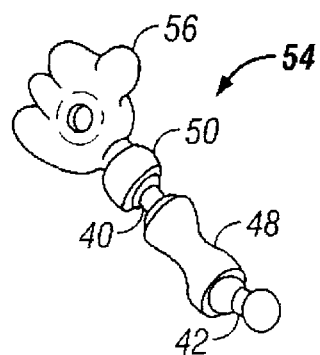
FIG. 2A is a perspective view of a lower jointed linkage arm support system made in the cavity of FIG. 2 for use in a skeleton of a toy.

After the socket plastic cools sufficiently, the mold plates 36, 38 open and ejector pin 52 frees the molded part from the mold. FIG. 2A shows the finished part as an example of a jointed linkage support system that is useful as the lower arm bone 54 of a doll. The arm bone includes the ball parts 40, 42 captured in the socket parts 48, 50.

The outer end of the second socket part 50 is molded in the form of a hand 56. Of course, the molded part may be cast in any suitable shape. The part shown in FIG. 2A may be completed in any suitable manner, as by encasing it in a stuffed plush/vinyl toy, as described below.

Figure 3:
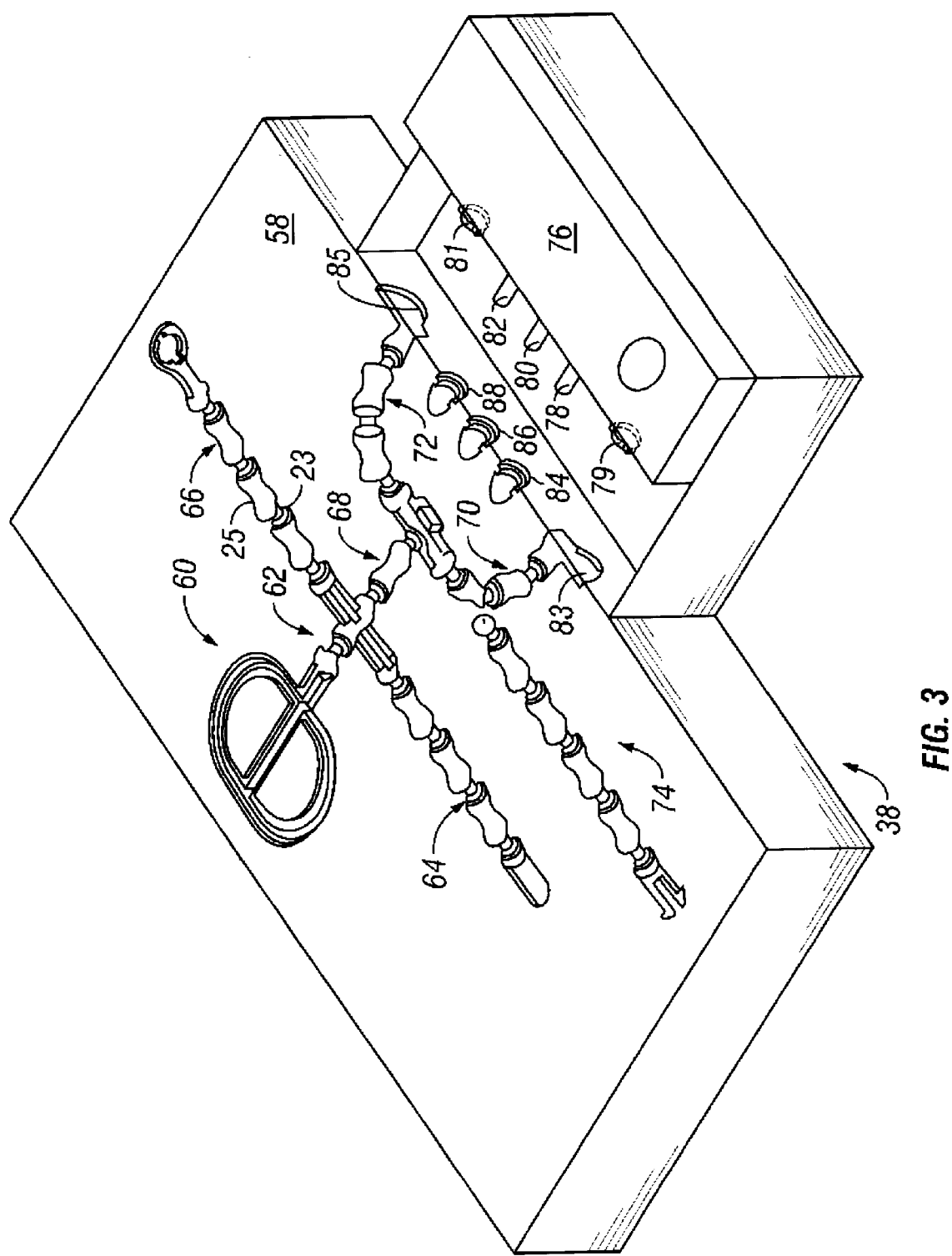
FIG. 3 is a perspective view showing a mold plate having one side of a mold primarily made in the form of communicating cavities having at least two contours and with empty cavities.

FIG. 3 shows a mold cavity 60 for making a jointed linkage support system of the invention which may be used, for example, as a skeleton in a stuffed plush/vinyl toy in the form of an animal or doll. In greater detail, mold plate 38 has a surface 58 with a cavity in the form of a full skeleton including: a head 60; a neck 62; two arms 64, 66; a spine 68; two legs 70, 72; and a tail 74. As can be seen, each of the parts 62–74 has a number of joints formed in a communicating series of cavities. There are two cavities which alternate with each other in the jointed linkage support system. One cavity 23 has contours for receiving ball parts 22, 22A. The other cavity 25 has contours for receiving the socket part 24.

A sliding block 76 has pins 78–82 which fit into holes 84–88 in the mold plate 38 in order to produce molded snap couplers which eliminate screws and other fasteners often found on the surface of plush/vinyl toys. Inserts 79, 81 will make openings in feet 83, 85.

Figure 4:
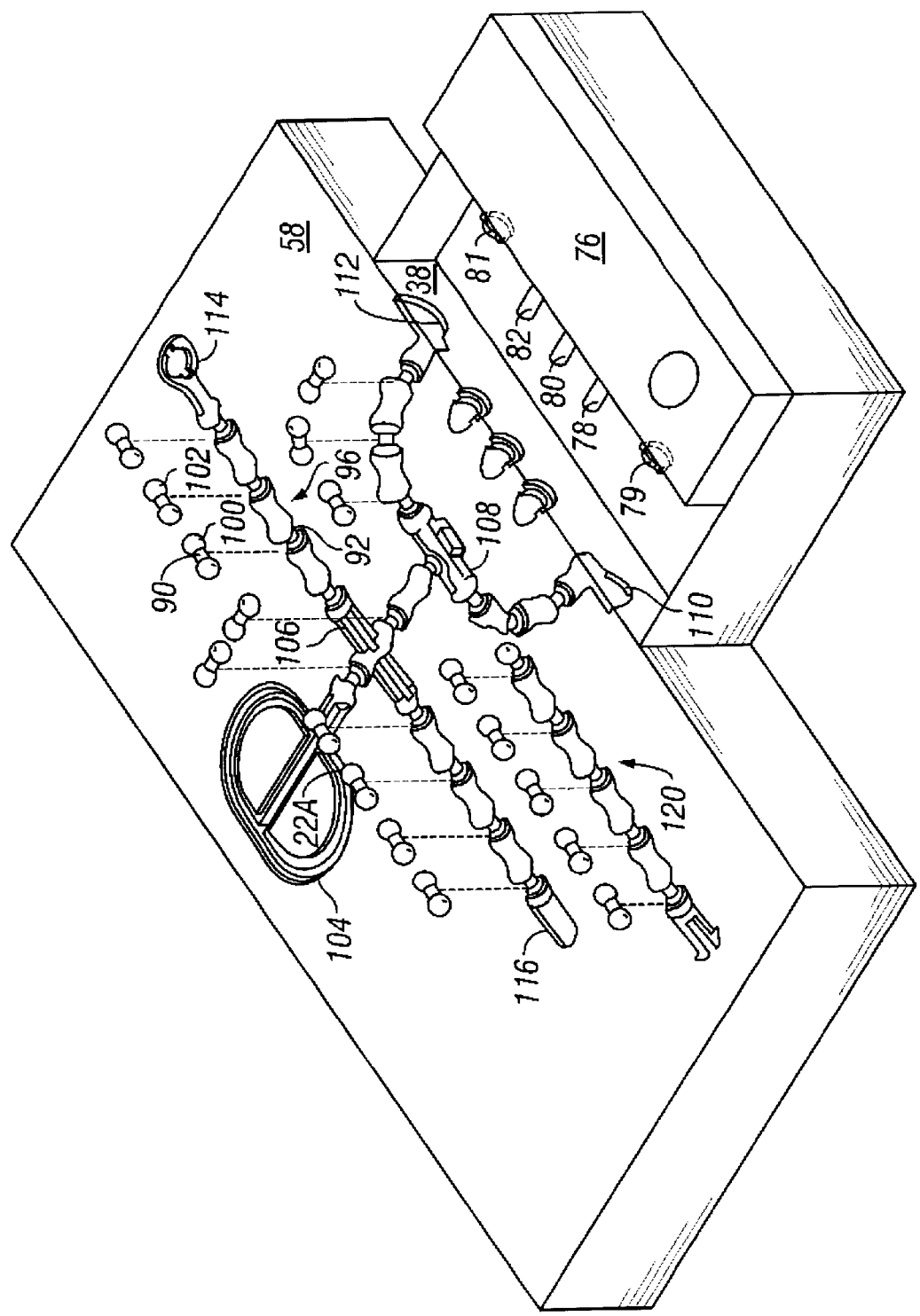
FIG. 4 is a schematic showing how insert joint parts (a rod with balls on its opposite ends) are ready to be placed in the corresponding mold cavities.
Figure 5:
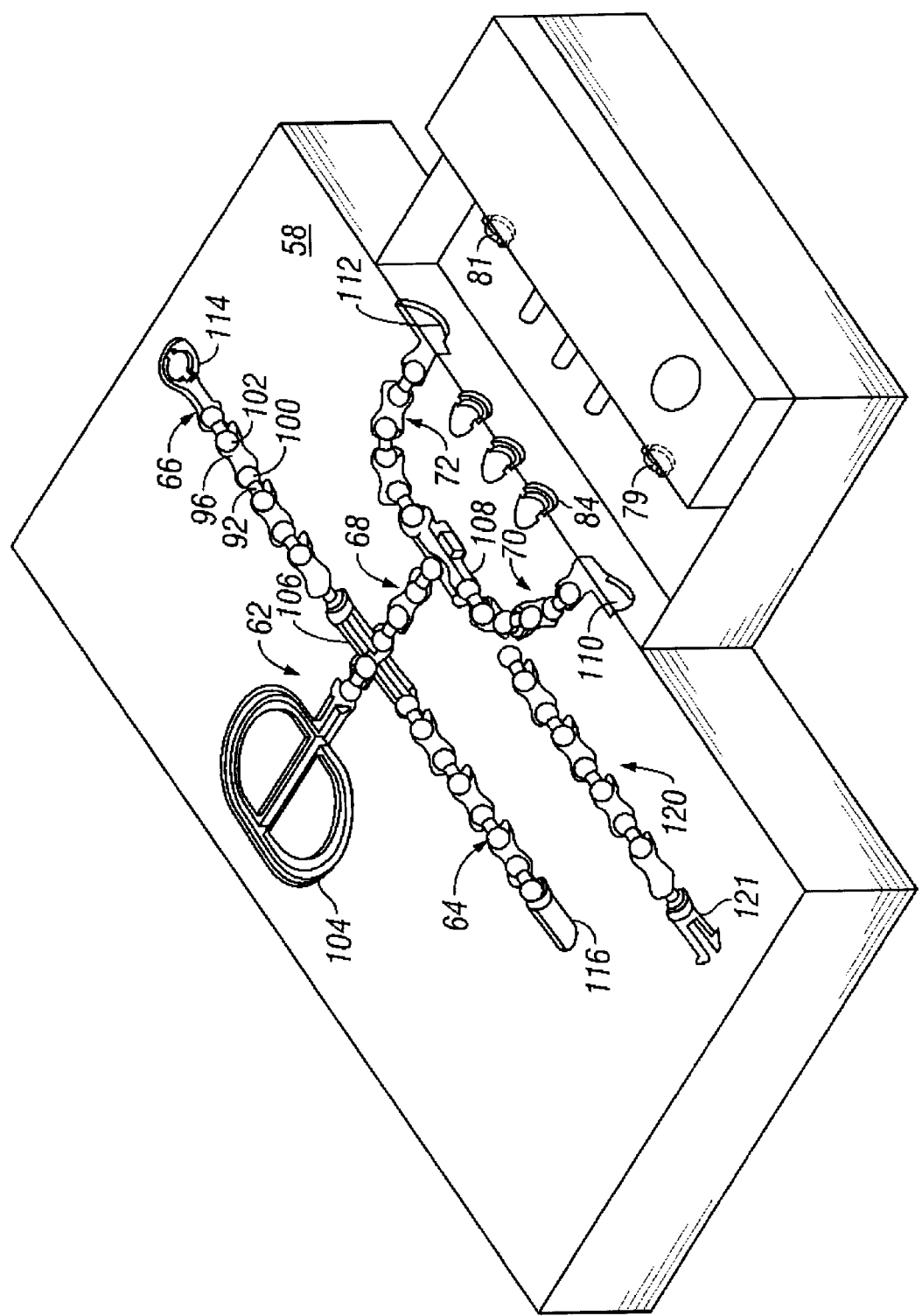
FIG. 5 shows all of the first or ball insert parts situated in the corresponding mold cavities, so that the insert ball parts become a part of the socket mold itself.

FIG. 4 is a composite and schematic illustration of the first of two steps for making a jointed linkage support system. The first step is to place one of the previously made, high temperature ball parts, such as 90, in each of the corresponding cavities, such as 92, in surface 58 of the mold plate 38. Hence, the balls 100, 102 become part of the internal contour of cavity 96. FIG. 5 shows a ball part insert in each of the other ball cavities on surface 58 of the mold.

After the mold is closed with the ball-parts in place, the second step in the molding process is to inject the low temperature plastic into the sleeve or socket mold cavities, such as 96, thereby forming a low temperature socket part in each end of the sleeve cavity. The molten low temperature plastic.flows into the cavity and around each ball. For example, a socket sleeve formed at 96 (FIG. 5) contains balls 100, 102, thus forming two ball and socket joints at opposite ends of the sleeve molded in cavity 96. After the plastic cools, the jointed linkage support system will emerge from the mold already assembled.

The finished molded, jointed linkage support system may also include other parts which are useful for manufacturing a finished product in the form of a doll or animal. For example, part 104 will support a head of the doll or animal. Part 106 will support he shoulders. Part 108 plays the role of the pelvic bone.

Any other suitable forms may also be produced in the cavity of the mold. For example, shoe support socket parts 110, 112 are formed in the foot positions. Devices 79, 81 will create openings as shown in the shoe support parts 110, 112 so that a snap coupler molded in cavity 84, for example, may be connected to a suitable independent part, such as a hand, glove, claw or the covering of a plush/vinyl toy, depending upon the desired appearance of a doll or animal. A part 116 is here shown as a blade in order to indicate that various parts may be made with any suitable contours.

For devices other than a doll or animal skeleton, similar unique parts may be included in the cavity. For example, if a part molded in cavity 120 is to become part of the tail of an animal toy, a special coupler 121 may be the last part of the jointed linkage support system. Depending upon the nature of the end product animal, the tail molded in cavity 120 may be molded as a separate part which is later added to the finished skeleton jointed linkage support system by any suitable means, such as being snapped or bonded into place on the "pelvic bone" 108.

Figure 6:
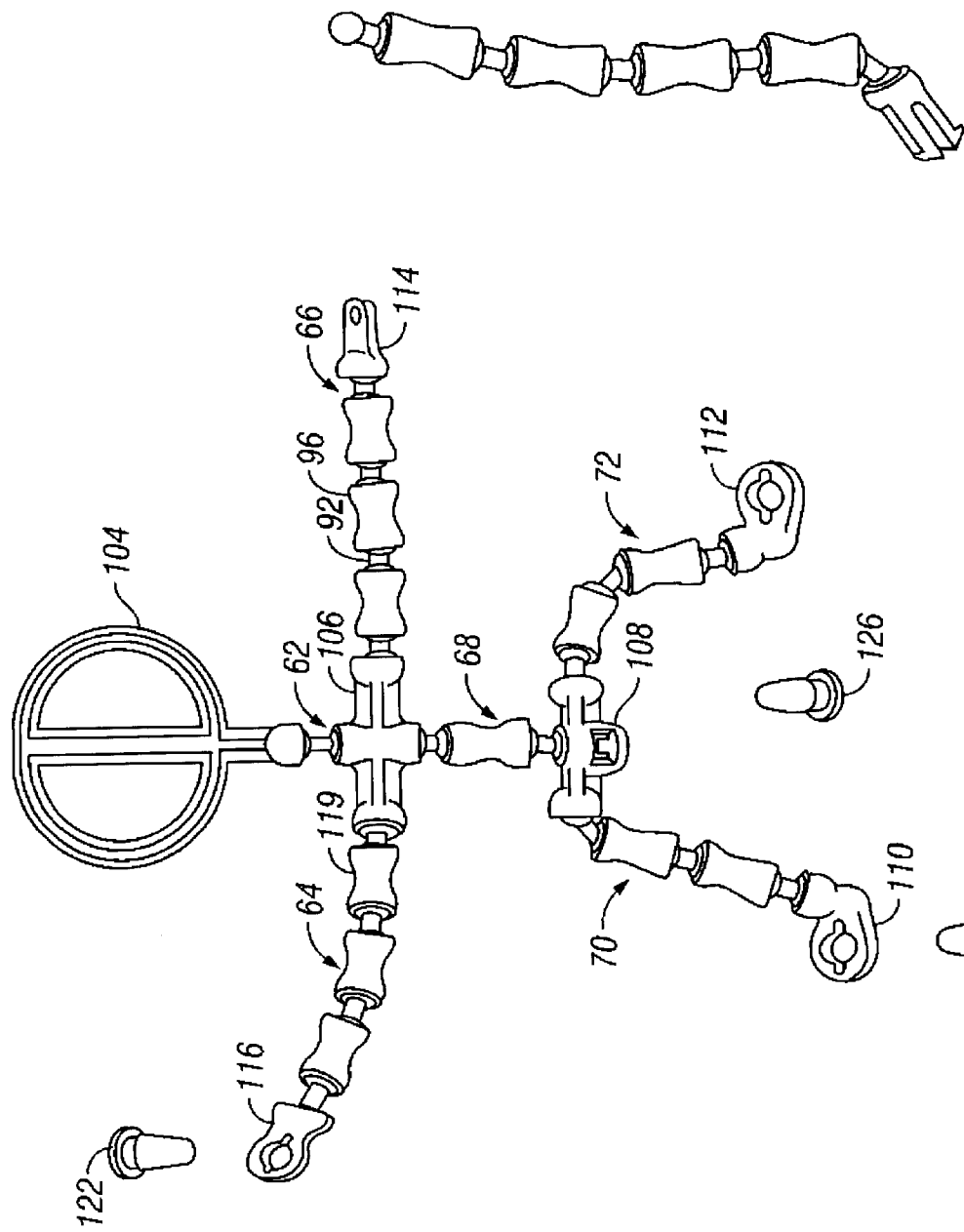
FIG. 6 is a front elevation view showing the jointed linkage support system as it appears in the form of a skeleton with all joints interconnected after it is removed from the mold.

Various options are shown which may or may not be provided depending upon the final form of any product that may be made from the jointed linkage support system of FIG. 6. For example, couplers 122–126 may be snapped into holes in parts 116, 110, 112 to attach hands, shoes or feet, or to attach the skeleton inside the plush/vinyl toy. Part 114 shows, by way of example, another form of coupler. Still other suitable couplers or devices may be molded at suitable places on the jointed linkage support system.

FIG. 6 shows the finished jointed linkage support system 119 as it is removed from the mold. FIG. 6A shows a single jointed linkage which was molded in cavity 120 (FIGS. 4, 5). Each of these is formed by the corresponding communicating series of individual cavities shown in FIGS. 2–6.

FIG. 7 shows a completed stuffed toy having a body 130 with a shell 131 made of any suitable material such as plush, fabric, vinyl and the like and stuffing 133 filling the space between shell 131 and linkage support system 119. The body 130 may be made in any conventional or convenient manner, such as by shells simulating animals, rag doll bodies, simulated skin, etc. Various stuffing materials may be used, such as polyester fiber, cotton, foam, plastic chips, plastic beads, gel, liquid in capsules and the like. The stuffing material does not interfere with the functioning of this system in light of all the linkage components being formed and joined together during the molding process that forms the skeleton. The feet 132 of the body 130 may be snapped to the skeleton foot 112 by way of coupler 126. In a similar manner, snap couplers may appear at any other suitable place on the skeleton. This use of snap couplers anchors the skeleton inside the doll or animal body without requiring connectors, such as screws, on the outside surface of the toy.

FIG. 8 is a partial side view of the toy of FIG. 7 to show the molded tail linked to the rest of the skeleton system. Here, the separately molded tail 120 has a coupler 136 which slips into a hole 138 in the "pelvic bone" 108. The coupling 136, 138 may be secured by snapping friction, cement, heat bonding, or the like. The point is that essentially the same support system may be assembled in different ways to make a number of different toys.

A child playing with the toy may bend the legs, arms, spine, neck, etc., to have the finished doll or animal assume many different poses or postures. The heat shrink friction between the ball and socket joints holds the pose or posture until the child next bends the legs, etc.

There are several combinations of thermoplastic compositions which illustrate how the first joint part and second joint part can be formed. The most important point is the melting temperatures of the materials. The second thermoplastic needs to have a melting point that is sufficiently less than the melting point of the first thermoplastic to make the joint with the desired friction and without a distortion or fusion of the first plastic responsive to the heat of the second plastic. Examples of suitable plastics with the necessary temperature characteristics are given below:

| Combination | Thermoplastic | Melting Temp | Injection Temp |
|---|---|---|---|
| 1 | 1st Acetal Copolymer | 175° C. | 204° C. |
|   | 2nd Polyethylene High Density | 130° C. | 150° C. |
| 2 | 1st Acetal Copolymer | 175° C. | 204° C. |
|   | 2nd Polyvinyl Chloride | 75° C. | 175° C. |
| 3 | 1st Polyamide Type 6/6 | 265° C. | 300° C. |
|   | 2nd Acetal Copolymer | 175° C. | 204° C. |
| 4 | 1st Polyamide Type 6/6 | 265° C. | 300° C. |
|   | 2nd Acrylonitrile Butadiene Styrene | 110° C. | 230° C. |
| 5 | 1st Polycarbonate | 150° C. | 295° C. |
|   | 2nd Polyethylene High Density | 130° C. | 150° C. |

In an alternate embodiment of the invention, one or more joints in a jointed linkage support system similar to that shown in FIG. 6 may include an integrally formed electrical switch actuated by relative movement of the components of the joint. FIGS. 9–13 disclose such a switch. A sleeve 222 is formed having similar external dimensions as the socket part 24 described above, but having an internal bore 225 extending axially through the sleeve 222. Under cut regions 226, 228 are formed within the sleeve at each end to form sockets for receiving ball portions. A contact ring 250 made from a conductive material such as copper is fitted within the internal bore 225 adjacent the undercut region 226. An electrical lead preferably formed of insulated wire is soldered to contact ring 250 at solder joint 254. The electrical lead 256 is threaded through a small exit bore 256 formed in sleeve 222 to communicate with external circuitry. FIG. 10 shows a cross section of sleeve 222 having the contact ring 250 positioned adjacent undercut region 226.

FIG. 11 shows a modified ball part 224 comprising a portion of the electrical to switch. As with the previous embodiment, the modified ball part 224 includes a central rod portion 230 with balls 232, 234 formed at each end. In the switch embodiment, a bore 258 is formed axially through the length of the modified ball part. Counter-sunk bores 260, 262 are formed at each end. A conductive shaft 264 is inserted through the axial bore 258 and extends at least into the counter sunk regions 260, 262. A spring 266 is friction fitted over a first end of conductive shaft 258 within counter sunk region 262 and extends out beyond the end of modified ball part 224. A contact head 268 is mounted at the distal end of spring 266. At the opposite end of the shaft 264 an electrical lead 272 is soldered to the shaft.

A ball and socket joint 220 may be formed by inserting the ball 234 of modified ball part 224 into the socket formed by undercut region 226 at the end of sleeve 222. Ball and socket joint 220 allows for angular motion of the ball 224 relative to the socket part 224 in substantially every direction. A second sleeve 236 similar to sleeve 222 but not having a conductive ring inside may be joined to the opposite end of modified ball part 224 by inserting ball 232 into an undercut socket formed at the end of sleeve 236. This arrangement is shown in cross section in FIG. 12.

When ball 232 is inserted within second sleeve 236, electrical lead 270 may be threaded through a small exit bore 272 formed in the side wall of the second sleeve 236 to communicate with external electrical circuitry. At the opposite end of the ball part 224, ball 234 is movably secured within the socket 226 at the end of sleeve 222. Spring 266 extends from the end of ball part 224 such that contact element 268, mounted at the distal end of the spring 266, is positioned within the annular confines of contact ring 250. Contact ring 250 and contact element 268 form the contact elements of an electrical switch across leads 252, 270.

FIG. 12 shows the socket part 222 and ball part 224 oriented in a substantially axially aligned position. As can be seen, contact element 268 is spaced apart from contact ring 250. In this position the electrical switch is open. FIG. 13 shows the ball part 224 angularly displaced relative to the socket part 222. As shown in FIG. 13 the contact element 268 is pivoted against the contact ring 250, thereby closing a circuit across leads 252, 270. Due to the flexibility of spring 266, contact element 268 may be held in engagement with contact ring 250 over a wide range of displacement angles of ball part 224 relative to socket part 222, while simultaneously allowing substantially unrestricted movement of the ball part 224 relative to the socket 222. According to an embodiment of the invention the switch joint allows movement of the ball part 24 of up to 30° from the axis of socket part 222 in any direction.

FIG. 13 also shows unmodified ball parts 280, 282 inserted into the sockets formed by the undercut regions of sleeves 222 and 236 at the ends of the sleeves opposite the switch components. The unmodified ball parts 280, 282 may be formed in an identical manner as described in the previous embodiment shown in FIGS. 1–8. In other words, unmodified ball parts, in addition to having the same shape as the ball parts of the previous embodiment, are formed of a plastic having a relatively higher melting point around which adjacent, relatively lower melting point plastic socket parts may be over molded. The sleeves 222 and 236 are also formed of a relatively high melting point plastic so that the switch components will not be damaged during an overmolding process.

Figure 14:
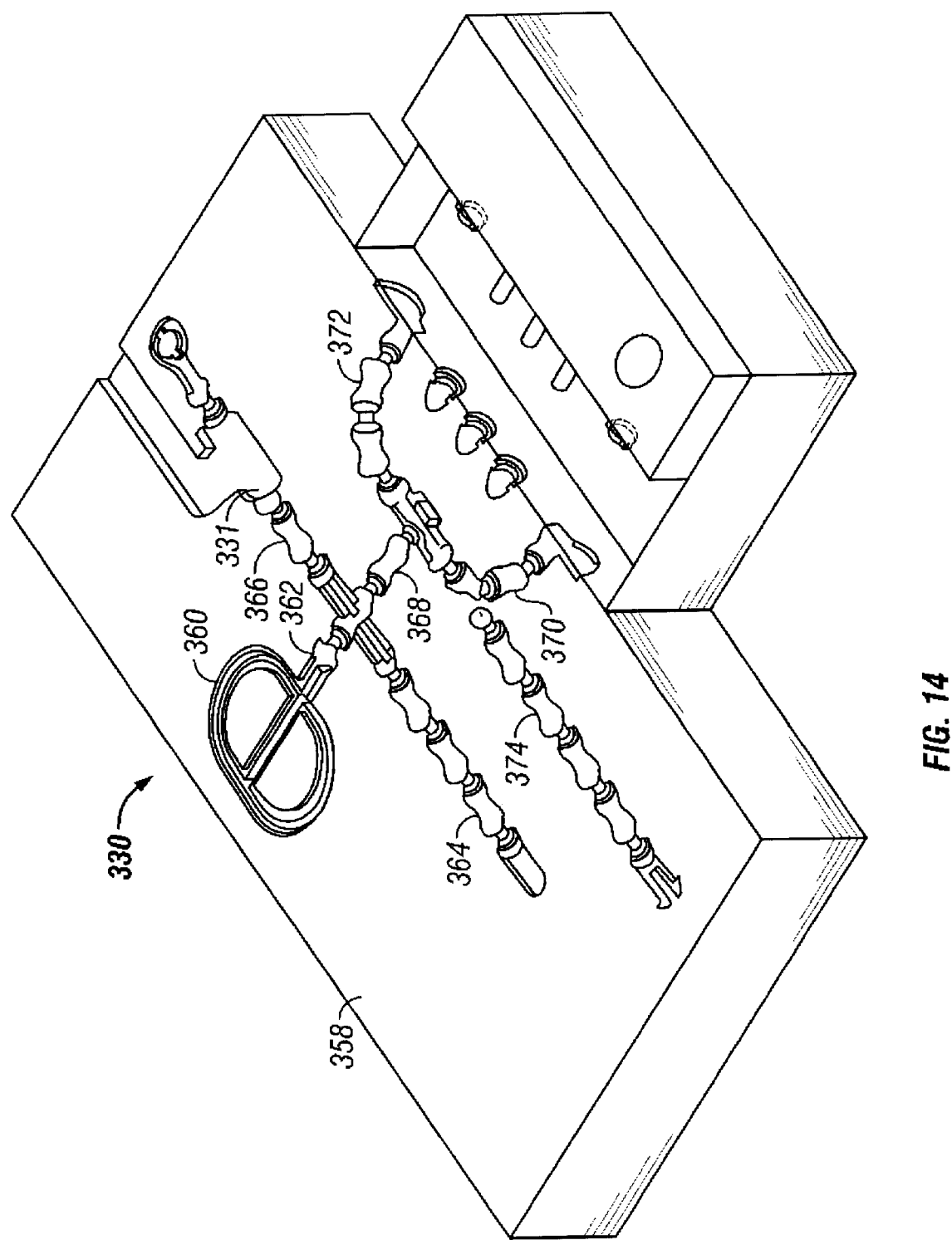
FIG. 14 is a perspective view of a mold plate similar to that of FIG. 3 but including a cavity for receiving a pre-molded switch assembly.

The process for creating a jointed linkage support system, such as skeleton in a stuff plush/vinyl toy, incorporating an integrally formed electrical switch will now be described with regard to FIGS. 14–18. FIG. 14 shows a mold plate 330 for forming the jointed linkage support system. Mold plate 330 is identical to the mold plate 30 of FIG. 3, but for the inclusion of a switch insert cavity 331. Thus, in addition to the added switch insert cavity 331, cavities formed in the surface 358 of mold plate 330 include a head 360; a neck 362; two arms 364, 366; a spine 368; two legs 370, 372; and a tail 374. In the embodiment shown the switch insert cavity 331 is located in arm 366.

Figure 15:
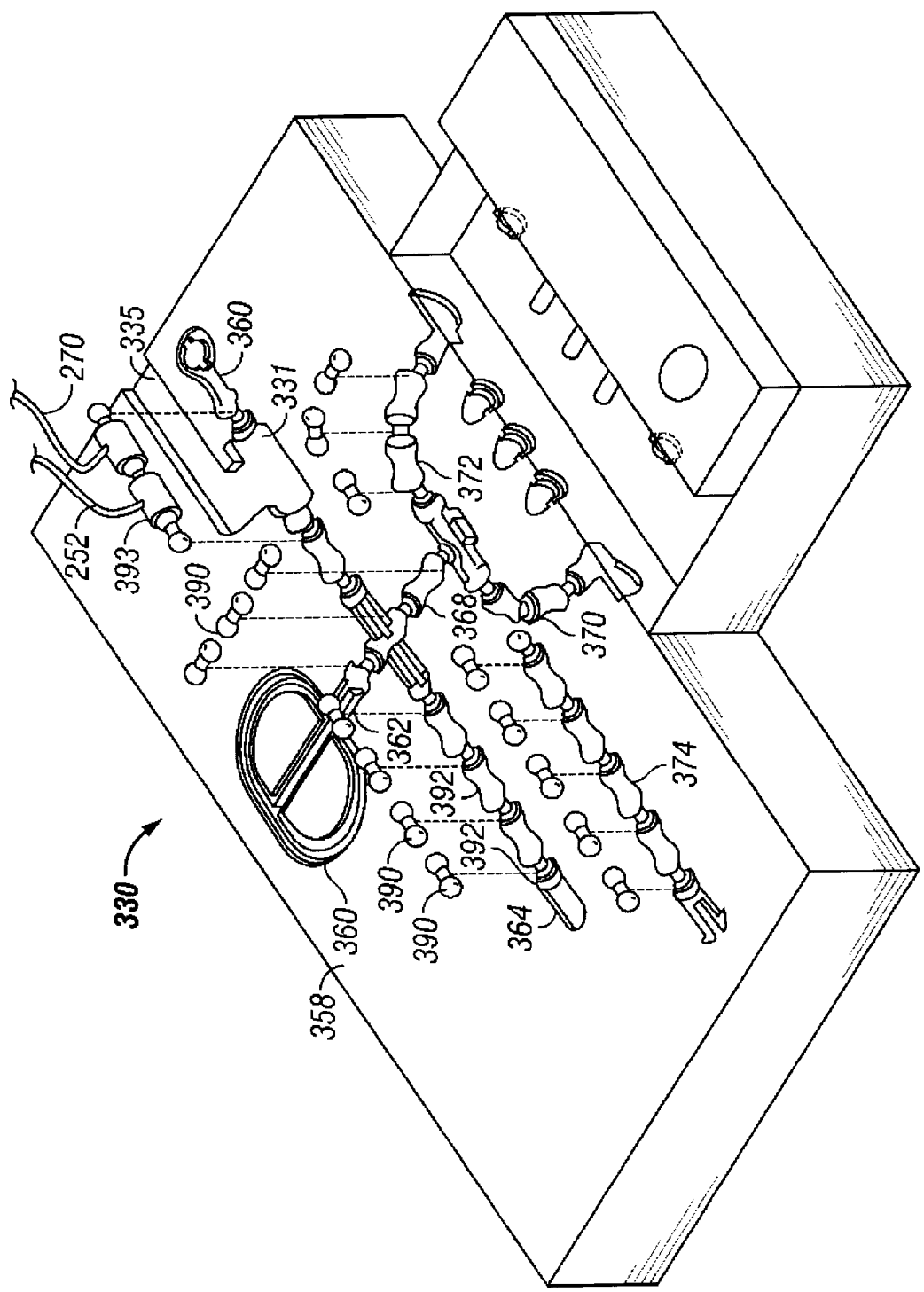
FIG. 15 is a schematic showing insert joint parts (a rod with balls on opposite ends) and a pre-molded switch assembly ready to be placed in the corresponding mold cavities.
Figure 16:
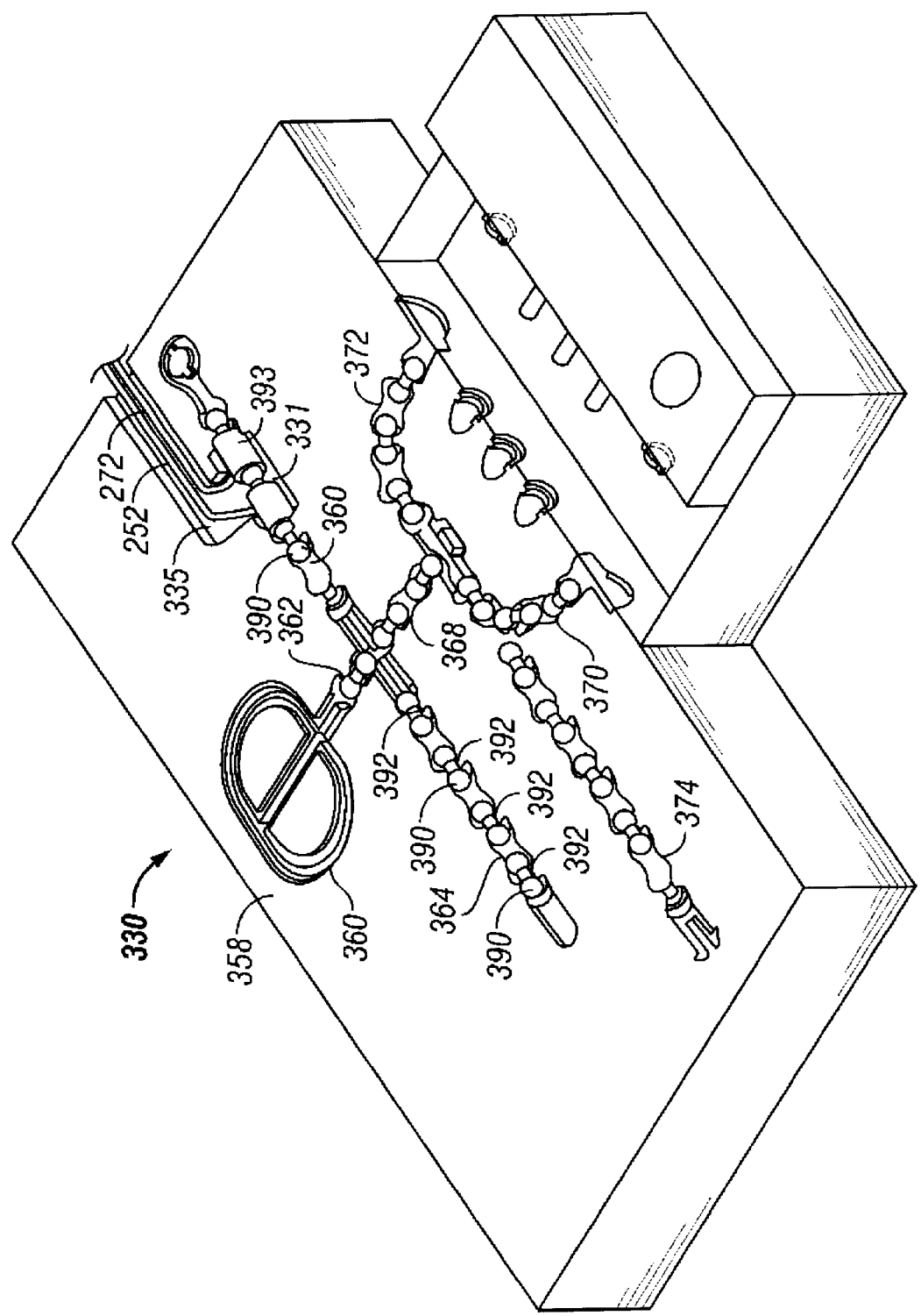
FIG. 16 shows all of the ball insert parts and the pre-molded switch assembly situated in the corresponding mold cavities so that the insert ball parts and the pre-molded switch assembly become a part of the socket mold itself.

Turning to FIG. 15, the step of placing the previously made higher melting point ball parts 390 in each of the corresponding cavities 392 is shown. This step is the same as in the previous embodiment except that a pre-assembled switch assembly 393 is also inserted into the switch insert cavity 331. An isolated trough 335 is formed in communication with the switch insert cavity 331 to protect the wire leads 252, 270 extending from the switch assembly. FIG. 16 shows all of the mold inserts in place prior to closing the mold.

Figure 17:
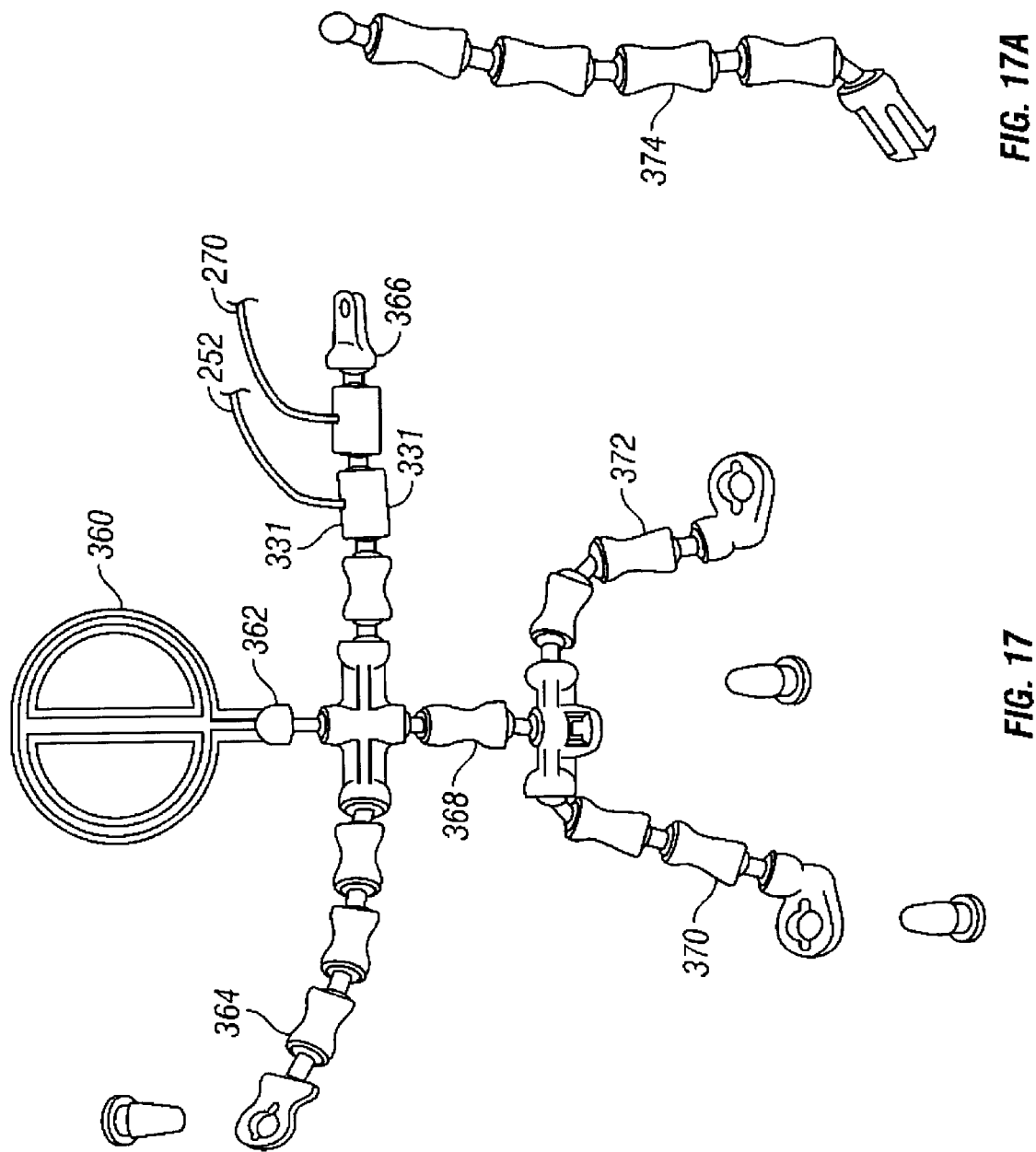
FIG. 17 is a front elevation showing the jointed linkage support system as it appears in the form of a skeleton including the pre-molded switch assembly after it has been removed from the mold.
Figure 18:
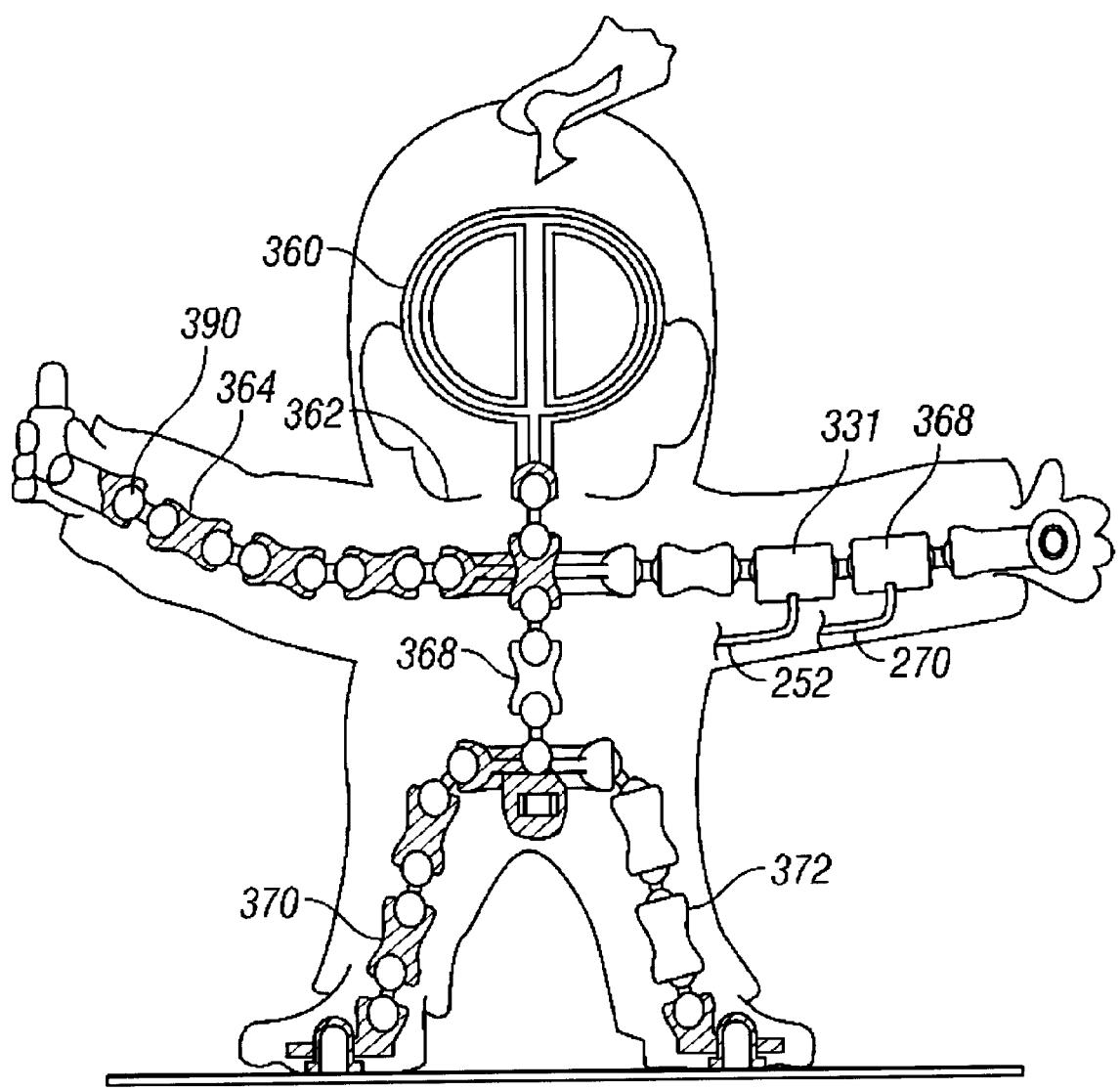
FIG. 18 is a front elevation showing the outline of a stuffed plush/vinyl toy with the molded jointed linkage support system inside the outline of the toy.

After the mold is closed with the ball parts and the switch assembly in place, low temperature plastic is injected into the sleeve or socket mold cavities, thereby forming low temperature socket parts between and partially surrounding the ball parts, including those extending from the pre-assembled switch assembly 331. The finished molded, jointed linkage support system, including the integrally formed switch assembly 331 is shown in FIG. 17. FIG. 18 shows the completed jointed linkage support system within the skin of a stuffed plush/vinyl toy figure. With the exception of the added switch assembly, the figures shown in FIGS. 17 and 18 are identical to those of FIGS. 6 and 7.

When the joint switch just described is incorporated into the skeletal frame of a toy figure, an electrical signal which is passed when the switch closes may be used to activate a special feature or special effect. For example, the switch can be used to activate a speech function, or activate various sensors such as touch sensors, sound sensors, light sensors and others.

There are many advantages resulting from the invention. Those who are skilled in the art will readily perceive various modifications that will fall within the scope and spirit of the invention. Therefore, the appended claims are to be construed to include all equivalent structures.

What is claimed is:

1. A method of making a jointed linkage support system, the method comprising:
   making a plurality of ball parts, each of the plurality of ball parts comprising a first ball and a second ball and having a melting point equal to or higher than a first melting point;
   providing a mold with a plurality of socket part mold cavities, each of the plurality of socket part mold cavities being configured for receiving at least two balls, and a plurality of ball part mold cavities which communicate with the socket part mold cavities;
   positioning the plurality of ball parts in the ball part mold cavities such that each of the plurality of socket part mold cavities receives a ball from one of the plurality of ball parts and a ball from another of the plurality of ball parts, and at least one of the ball parts is positioned between two identical socket part mold cavities; and
   introducing a material into the socket part mold cavities to form a socket part within each socket part mold cavity, wherein the material has a second melting point lower than the first melting point and the material is introduced into the socket part mold cavities at a temperature lower than the first melting point and equal to or higher than the second melting point; and
   allowing the material to cool, thereby forming the jointed linkage support system.

2. The method of claim 1 wherein the material has a shrink characteristic for gripping the ball part upon cooling of the material.

3. The method of claim 2 wherein the shrink characteristic grips the ball part with a predetermined amount of friction.

4. The method of claim 1 wherein the ball parts and socket parts are plastic.

5. The method of claim 1 wherein the step of providing a mold further comprises providing a mold with at least one switch assembly mold cavity in communication with adjacent ball part mold cavities, and the method further comprises positioning a switch assembly made from a material having a melting point higher than the second melting point within the at least one switch assembly mold cavity prior to introducing the material into the socket part cavities.

6. The method of claim 5 wherein the switch assembly is associated with one of the plurality of ball parts and the step of positioning the switch assembly within the switch assembly mold cavity includes positioning a portion of the ball part associated with the switch assembly within a socket part cavity.

7. A method of making a jointed linkage support system, the method comprising:
   providing a mold having a first set of cavities with contours corresponding to a first part and a second set of cavities with contours corresponding to a second part, wherein the first and second sets of cavities are in communication and positioned such that a plurality of individual cavities of the first set of cavities alternate with a plurality of individual cavities of the second set of cavities, and wherein at least one of the first set of cavities is bisected by a plane of symmetry between two identical socket part mold cavities;
   making a plurality of first parts, each of the plurality of first parts having a first melting point;
   placing the plurality of first parts into the first set of cavities with a portion of the first parts extending into the second set of cavities;
   introducing a material into the second set of cavities to form a plurality of second parts, wherein the material has a second melting point lower than the first melting point and the material is introduced into the cavities at a temperature lower than the first melting point and equal to or higher than the second melting point; and
   allowing the material to cool, thereby forming the jointed linkage support system.

8. The method of claim 7 wherein the plurality of second parts have a shrink characteristic which upon cooling the second parts grip the first parts with a predetermined amount of friction.

9. The method of claim 7 wherein the first and second parts together form a ball and socket joint.

10. The method of claim 7 wherein each of the plurality of first parts comprises a first ball and a second ball, and each of the plurality of second parts each comprises sockets to capture the balls of the first parts.

11. The method of claim 7 wherein the second parts capture the portions of the first parts which extend into the second set of cavities to form movable joints between the first and second parts.

12. A method of molding a jointed linkage support system, the method comprising the steps of:
   providing a plurality of first parts having a first contour, each of the plurality of first parts having a first melting point;
   providing a mold having a series of communicating cavities, the cavities in the mold comprising a first set and a second set of cavities, the first set of cavities having contours corresponding to the first contour and positioned such that a plurality of individual cavities of the first set of cavities alternate with a plurality of individual cavities of the second set of cavities, and the second set of cavities having a second contour;
   placing the first parts in the first set of cavities with portions of the first parts extending into the second set of cavities;

molding a plurality of second parts by injecting into the second set of cavities a material having a second melting point which is lower than the first melting point, wherein the material is introduced into the second set of cavities at a temperature equal to or higher than the second melting point and lower than the first melting point; and allowing the material to cool, thereby forming a joint between each of the first and second parts to mold the jointed linkage support system in which the first parts pivot with respect to the second parts without an he second parts engaging an adjacent one of the second parts.

13. The method of claim 12 further comprising the step of forming the communicating cavities into a geometry of a linkage support system having a moving joint at every, joint between the first and second parts.

14. The method of claim 12 wherein each of the plurality of first parts comprises a first ball and a second ball and each of the plurality of second parts comprises sockets to capture the balls of the first parts.

15. A method of making a jointed linkage, the method comprising:

making a ball part in the shape of a rod with a first ball at one end and a second ball at the other end, the ball part having a first melting point;

providing a mold with a first socket part mold cavity and a second socket part mold cavity, each socket part mold cavity being configured for receiving at least one ball;

positioning the ball part in the mold such that at least a portion of the first ball extends into the first socket part mold cavity and at least a portion of the second ball extends into the second socket part mold cavity;

introducing a material into the socket part mold cavities to form a socket part within each socket part mold cavity to capture the first and second balls, wherein the material has a second melting point which is lower than the first melting point and the material is introduced into the socket part mold cavities at a temperature equal to or higher than the second melting point and lower than the first melting point; and allowing the material to cool, thereby forming a ball and socket joint and molding a jointed linkage.

16. The method of claim 15 wherein the material has a shrink characteristic for gripping the ball part upon cooling of the material.

17. The method of claim 16 wherein the shrink characteristic grips the ball part with a predetermined amount of friction.

18. The method of claim 15 wherein the step of providing a mold further comprises providing a mold with at least one switch mold cavity in communication with at least one of the socket part mold cavities; and positioning a switch assembly made from a material having a melting point higher than the second melting point within the at least one switch assembly mold cavity prior to introducing the second material into the socket part mold cavities.

19. A method of making a jointed linkage support system, the method comprising:

making a plurality of ball parts, each of the plurality of ball parts comprising a first ball and a second ball and having a melting point equal to or higher than a first melting point;

providing a mold with a plurality of socket part mold cavities, each of the plurality of socket part mold cavities being configured for receiving at least two balls, and a plurality of ball part mold cavities which communicate with the socket part mold cavities;

positioning the plurality of ball parts in the ball part mold cavities such that each of the plurality of socket part mold cavities receives a ball from one of the plurality of ball parts and a ball from another of the plurality of ball parts; and introducing a material into the socket part mold cavities to form a socket part within each socket part mold cavity, wherein the material has a second melting point lower than the first melting point and the material is introduced into the socket part mold cavities at a temperature lower than the first melting point and equal to or higher than the second melting point;

allowing the material to cool, thereby forming the jointed linkage support system;

providing a mold having at least one switch assembly mold cavity in communication with adjacent ball part mold cavities; and positioning a switch assembly associated with one of the plurality of ball parts.

20. A method of making a jointed linkage support system comprising:

providing a mold with a plurality of socket part mold cavities and ball part mold cavities, each socket part mold cavity being configured for receiving at least two preformed balls;

making said ball parts from a first material having a first melting temperature;

positioning at least two ball parts in the mold with a ball of each ball part located in a desired socket part cavity;

introducing into the socket part cavities a second material having a second melting temperature lower than the first melting temperate;

allowing the second material to cool to form a joint between the socket and ball parts;

removing the resulting jointed linkage support system;

providing a mold with at least one switch assembly mold cavity in communication with adjacent ball part mold cavities;

positioning a switch assembly associated with one of the plurality of ball parts; and positioning a portion of the ball part associated with the switch assembly with a socket part cavity.

21. A method of making a jointed linkage, the method comprising:

making a ball part in the shape of a rod with a first ball at one end and a second ball at the other end, the ball having a first melting point;

providing a mold with a first socket part mold cavity and a second socket part mold cavity, each socket part mold cavity being configured for receiving at least one ball;

providing a mold having at least one switch mold cavity in communication with at least one of the socket part mold cavities; and positioning a switch assembly made from a material having a melting point higher than the second melting point within the at least one switch assembly mold cavity prior to introducing the second material into the socket part mold cavities.

* * * * *